(12) United States Patent
Hosotani

(10) Patent No.: US 8,724,347 B2
(45) Date of Patent: May 13, 2014

(54) SWITCHING CONTROL CIRCUIT AND SWITCHING POWER SUPPLY APPARATUS INCLUDING AN IC-BASED SWITCHING CONTROL CIRCUIT

(71) Applicant: Murata Manufacturing Co., Ltd., Nagaokakyo (JP)

(72) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/692,038

(22) Filed: Dec. 3, 2012

(65) Prior Publication Data

US 2013/0088896 A1 Apr. 11, 2013

Related U.S. Application Data

(63) Continuation of application No. PCT/JP2011/057094, filed on Mar. 24, 2011.

(30) Foreign Application Priority Data

Jun. 10, 2010 (JP) .................................. 2010-133122

(51) Int. Cl.
H02M 3/335 (2006.01)
(52) U.S. Cl.
USPC .......... 363/21.04; 363/21.12; 363/49; 363/97
(58) Field of Classification Search
USPC ................................. 363/21.04, 21.12, 49, 97
See application file for complete search history.

(56) References Cited

U.S. PATENT DOCUMENTS

| | | | |
|---|---|---|---|
| 4,598,351 A | 7/1986 | Fair et al. | |
| 2003/0048645 A1 | 3/2003 | Hosotani et al. | |
| 2009/0001944 A1 | 1/2009 | Kim et al. | |
| 2010/0073041 A1 | 3/2010 | Djenguerian et al. | |
| 2010/0157629 A1* | 6/2010 | Yoshikawa | 363/21.01 |
| 2010/0321039 A1 | 12/2010 | Matthews et al. | |

(Continued)

FOREIGN PATENT DOCUMENTS

| | | |
|---|---|---|
| JP | 61-501305 A | 6/1986 |
| JP | 10-243650 A | 9/1998 |

(Continued)

OTHER PUBLICATIONS

Official Communication issued in International Patent Application No. PCT/JP2011/057094 mailed on Jun. 28, 2011.

*Primary Examiner* — Jeffrey Sterrett
(74) *Attorney, Agent, or Firm* — Keating & Bennett, LLP

(57) ABSTRACT

In a switching control circuit, a length of a soft start period is set by a time constant of an external circuit that is connected to a soft start terminal of a switching control IC. After a voltage of the soft start terminal has reached a predetermined voltage at the termination of the soft start period, the on-pulse period of a first switching device is limited by a maximum value. When a Zener diode is connected between the soft start terminal and ground, the upper limit voltage of the soft start terminal is a Zener voltage and, hence, the maximum on-pulse period is limited by this voltage. As a result, the switching control circuit and a switching power supply apparatus, which have a soft start function and a power limiting function, are reduced in size and cost by limiting the number of terminals.

20 Claims, 16 Drawing Sheets

(56) References Cited

U.S. PATENT DOCUMENTS

| | | | |
|---|---|---|---|
| 2011/0175587 A1* | 7/2011 | Hosotani | 323/283 |
| 2011/0211376 A1* | 9/2011 | Hosotani | 363/97 |
| 2013/0088896 A1* | 4/2013 | Hosotani | 363/17 |
| 2013/0128623 A1* | 5/2013 | Hosotani | 363/21.01 |

FOREIGN PATENT DOCUMENTS

| | | |
|---|---|---|
| JP | 2002-051539 A | 2/2002 |
| JP | 2003-88117 A | 3/2003 |
| JP | 2006-337880 A | 12/2006 |
| JP | 2007-73954 A | 3/2007 |
| JP | 2007-159306 A | 6/2007 |
| JP | 2007-159316 A | 6/2007 |
| JP | 4026422 B2 | 12/2007 |
| JP | 2009-11144 A | 1/2009 |
| JP | 2010-75044 A | 4/2010 |
| JP | 2010-148162 A | 7/2010 |
| WO | 2010/104172 A1 | 9/2010 |

* cited by examiner

SWITCHING CONTROL CIRCUIT AND SWITCHING POWER SUPPLY APPARATUS INCLUDING AN IC-BASED SWITCHING CONTROL CIRCUIT

BACKGROUND OF THE INVENTION

1. Field of the Invention

The present invention relates to IC-based switching control circuits and switching power supply apparatuses including an IC-based switching control circuit.

2. Description of the Related Art

In switching power supply apparatuses, a switching control IC includes circuits for realizing various functions, such as an output control operation, an activation time control operation, an over-current protection operation, an over-voltage protection operation, a standby control operation, and a power factor improvement operation. With an increase in the number of these functions, higher capabilities are provided by the switching control IC.

To set the functions of a switching control IC to support the operational specifications of an application, a plurality of terminals are required for an interface with an external circuit, for each of the functions. Hence, an increase in the number of provided functions naturally results in an increase in the number of terminals. An increase in the number of terminals leads to an increase in the size of the package of the switching control IC and an increase in the unit cost of the IC.

If the number of terminals of a switching control IC is limited, the provided functions are limited. Hence, it becomes necessary to prepare various types of ICs corresponding to the specific functions and selectively use these types of ICs in accordance with the specifications or purposes. In this case, the number of the types of ICs is increased, resulting in increased complexity not only in the manufacturing process of ICs but also in the management of the ICs. This leads to an increase in the unit cost of the ICs.

In general, when more functions are required, the size of an IC is inevitably increased. However, in recent years, an increased number of functions have been required even in a small switching control circuit. At present, to lower the unit cost of semiconductor devices such as ICs, it is effective to produce a large number of few types of devices. Further, from the viewpoint of an IC package, the unit cost of an IC can be lowered when an IC is configured to have a small number of terminals and a small size.

Japanese Unexamined Patent Application Publication No. 2007-73954 discloses a switching control IC with an aim of reducing the number of terminals.

FIG. 1 is a circuit diagram of a switching power supply apparatus disclosed in Japanese Unexamined Patent Application Publication No. 2007-73954. Referring to FIG. 1, a switching power supply apparatus 101 includes a transformer 105 having a primary winding 127 and a secondary winding 129, a rectifying/smoothing circuit formed of a diode 117 and a capacitor 119, a feedback circuit formed of a Zener diode 121, a photocoupler 113, and a resistor 123, and an integrated circuit 103.

The integrated circuit 103 is connected to the primary winding 127. The integrated circuit 103 is a switching regulator IC including an internal switch coupled between a drain (D) terminal and a source (S) terminal of the integrated circuit 103.

During operation, a switch within the integrated circuit 103 controls transmission of energy from an input 107 to an output 109 via a transformer 105. A feedback signal is input to the integrated circuit 103 from the feedback circuit.

A multifunctional capacitor 111 is connected to a bypass terminal of the integrated circuit 103. The multifunctional capacitor 111 is used to provide a power supply coupling function of the integrated circuit 103 during a normal operation. An internal circuit within the integrated circuit 103, which receives a power or a bias current from the multifunctional capacitor 111, makes the circuit operate during a normal operation through control of the output 109.

During the initialization period of the integrated circuit 103, the multifunctional capacitor 111 is used to select the parameter/mode of the integrated circuit 103. During this initialization period, the parameter/mode of the integrated circuit is selected.

One of the functions of a switching power supply apparatus is a soft start function. This is a function of gradually increasing the on-period of an output pulse for driving an FET in accordance with a voltage of a soft start control terminal (SS terminal) at the time of activating the power supply. The speed with which a voltage of the SS terminal changes is set by the capacitance of a capacitor externally connected to the SS terminal. In other words, the speed with which the voltage of the capacitor voltage at the time of activation increases determines the speed with which the on-period is increased, whereby a soft start period is determined. Hence, when the capacitance is large, the voltage increases at a low speed and the soft start period becomes long (the on-period is increased at a slow pace), and when the capacitance is small, the voltage increases at a high speed and the soft start period becomes short (the on-period is increased at a fast pace).

However, such a soft start control terminal (SS terminal) controls only the period of a soft start by controlling the speed with which the voltage of the soft start terminal is increased, and cannot determine the maximum value of the on-pulse period. Hence, a terminal different from the SS terminal is required to control the maximum on-pulse period, thereby limiting power. As a result, the number of terminals of the IC is increased, which prevents a reduction in the size of the IC and increases the unit cost of the IC. In other words, there is a problem in that the size of the package of a switching control IC is increased and the unit cost of the IC is increased.

SUMMARY OF THE INVENTION

Preferred embodiments of the present invention provide a switching control circuit and a switching power supply apparatus which have a soft start function and a power limiting function and which have been reduced in size and cost by suppressing an increase in the number of terminals.

A switching control circuit according to a preferred embodiment of the present invention is preferably for use in a power conversion circuit of a switching power supply apparatus and includes a plurality of external terminals; a semiconductor integrated circuit controlling on/off operations of a switching device; a soft start terminal that receives a control voltage used to control on/off switching operations of the switching device during a soft start period, which is an activation period from a start of an operation to a steady operation of the power conversion circuit; a soft start controller arranged and programmed to control an on-period of the switching device during the activation period based on a signal of the soft start terminal; and a maximum on-pulse period limiting device arranged to detect, as a determination object signal, a voltage induced in an external circuit that is connected to the soft start terminal and that includes at least a resistor element or a semiconductor element, and arranged to set a limit value of an on-period of the switching device during a normal period in accordance with the determination object signal.

The soft start period may preferably be set by a capacitance value of the external circuit connected to the soft start terminal.

The soft start controller may preferably include a voltage-period conversion circuit that converts the voltage of the soft start terminal into an on-pulse period of a control signal for the switching device.

It is preferable that there is a linear relationship between the voltage and the period in the voltage-period conversion circuit.

The voltage-period conversion circuit preferably sets a limit value of the on-pulse period, and sets an upper limit of the limit value of the on-pulse period when the voltage of the soft start terminal is a predetermined voltage or higher.

The maximum on-pulse period limiting device preferably sets the limit value of the on-pulse period using a Zener voltage induced in a Zener diode connected to the soft start terminal.

The switching control circuit preferably also includes a constant current circuit that supplies a constant current to the soft start terminal.

A switching power supply apparatus according to a preferred embodiment of the present invention has a configuration in which the switching control circuit described above is provided in the power conversion circuit.

According to various preferred embodiments of the present invention, without providing a dedicated terminal, a soft start function and a power limiting function can be set using a single terminal and, hence, the number of the terminals of a switching control IC is not increased and a switching control circuit having an over-current protection function is realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
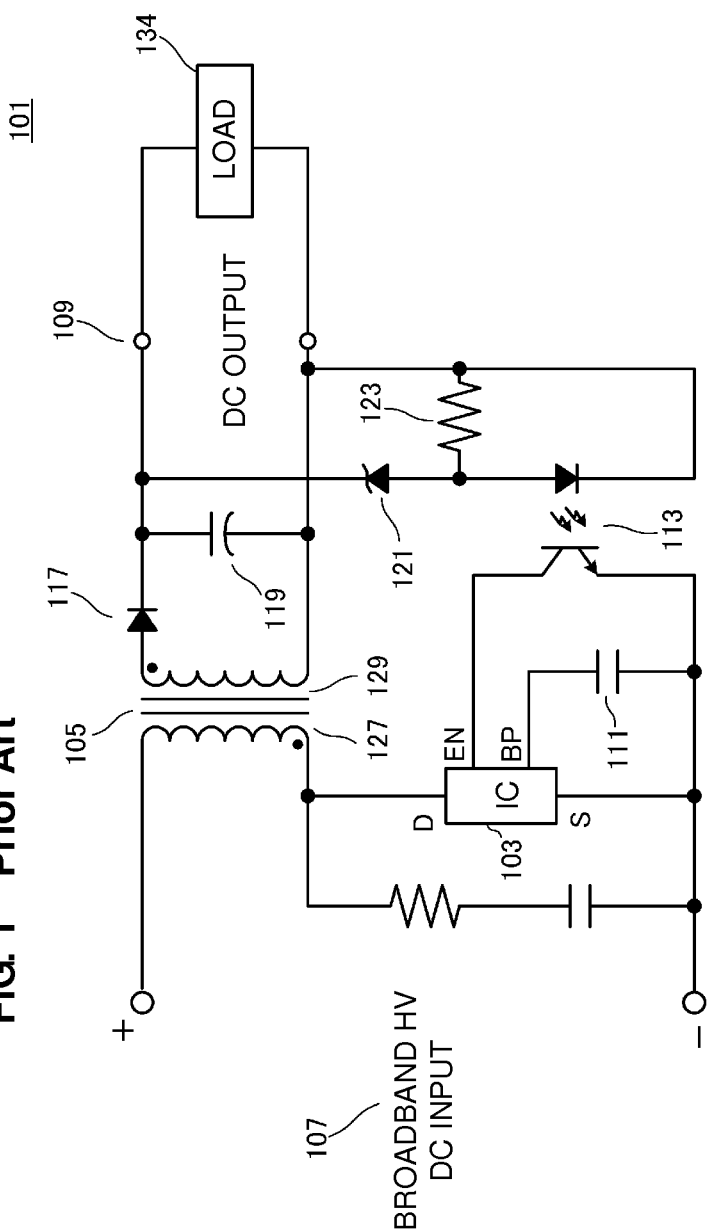
FIG. 1 is a circuit diagram of a switching power supply apparatus disclosed in Japanese Unexamined Patent Application Publication No. 2007-73954.
Figure 2:
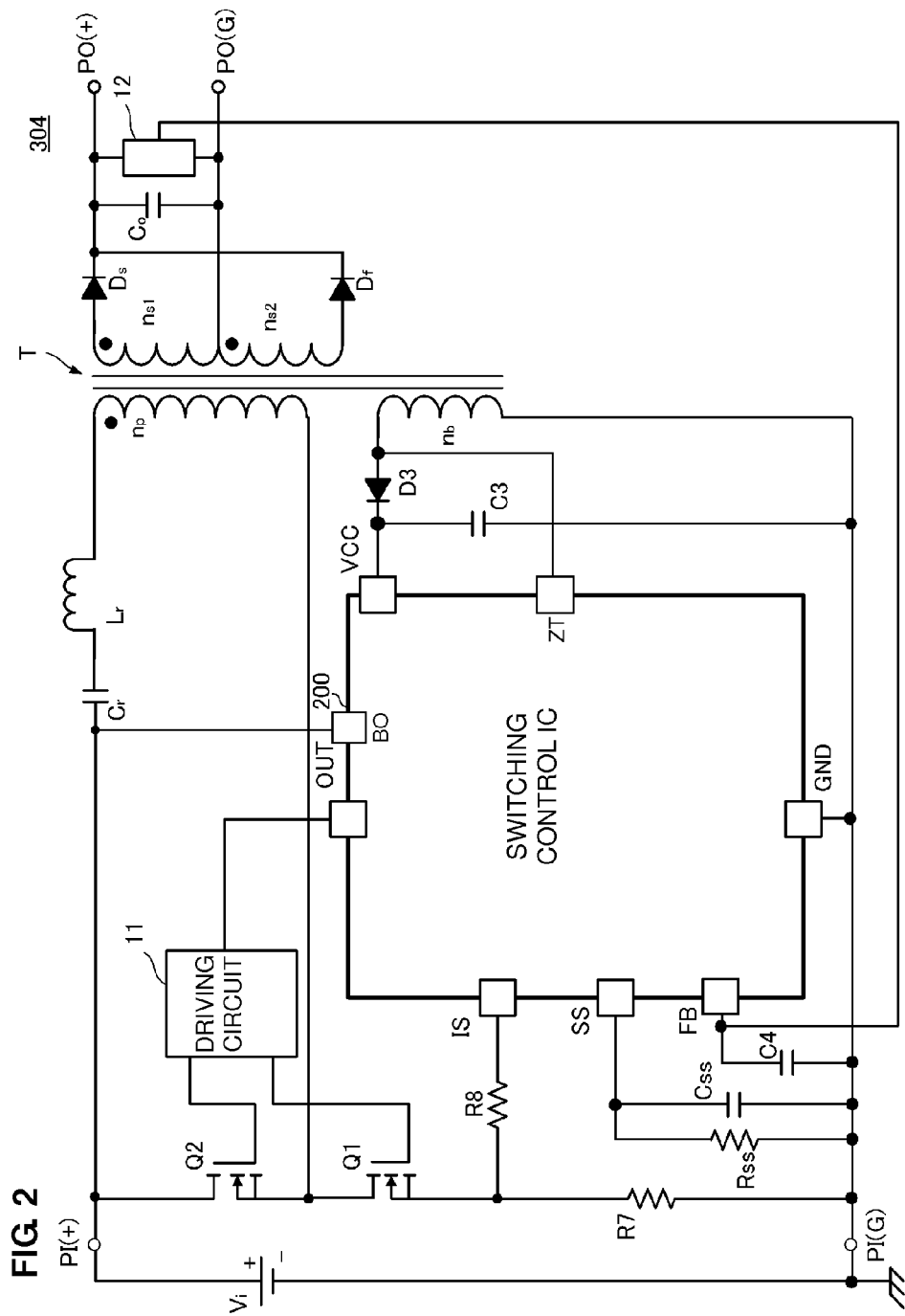
FIG. 2 is a circuit diagram of a switching power supply apparatus 304 according to a first preferred embodiment of the present invention.

FIG. 2 is a circuit diagram of a switching power supply apparatus 304 according to a first preferred embodiment of the present invention. The switching power supply apparatus 304 preferably includes a switching control IC 200 corresponding to a switching control circuit of a preferred embodiment of the present invention.

A voltage of a DC input power supply Vi is input between input terminals PI(+) and PI(G) of the switching power supply apparatus 304. A predetermined DC voltage is output to a load connected between output terminals PO(+) and PO(G) of the switching power supply apparatus 304.

Between the input terminals PI(+) and PI(G), a first series circuit is provided in which a capacitor Cr, an inductor Lr, a primary winding np of a transformer T, a first switching device Q1, and a current detection resistor R7 are connected to one another in series. A second switching device is connected in parallel with a series circuit that includes the capacitor Cr, the inductor Lr, and the primary winding np of the transformer T.

The first switching device Q1 preferably is an FET, and the drain terminal is connected to one end of the primary winding np of the transformer T. The source terminal is connected to one end of the current detection resistor R7. The second switching device Q2 preferably is an FET, and the drain terminal is connected to the input terminal Vin(+). The source terminal is connected to the drain terminal of the first switching device Q1.

A first rectifying/smoothing circuit including diodes Ds and Df and a capacitor Co is connected to secondary windings ns1 and ns2 of the transformer T. An AC voltage output from the secondary windings ns1 and ns2 is subjected to full wave rectification and smoothing performed by the first rectifying/smoothing circuit and output to the output terminals PO(+) and PO(G).

A rectifying/smoothing circuit including a diode D3 and a capacitor C3 is connected to a drive winding nb of the transformer T. A DC voltage obtained by this rectifying/smoothing circuit is applied between a GND terminal and a VCC terminal of the switching control IC 200 as a power supply voltage.

As described above, a power conversion circuit preferably includes the first and second switching devices Q1 and Q2, the capacitor Cr, the inductor Lr, the transformer T, the diodes Ds and Df, the capacitor Co, and the like.

The switching control IC 200 outputs a square wave signal from an OUT terminal to a driving circuit 11. The driving circuit 11 performs alternate on/off control of the first switching device Q1 and the second switching device Q2. Here, a dead time period is provided to prevent Q1 and Q2 from being turned on at the same time.

A current detection terminal IS of the switching control IC 200 includes a resistor R8 connected thereto to receive a drop voltage across the current detection resistor R7.

A feedback circuit 12 is connected between the switching control IC 200 and the output terminals PO(+) and PO(G). The feedback circuit 12 is a circuit that generates a feedback signal based on the comparison of a divided value of a voltage between the output terminals PO(+) and PO(G) and a reference voltage and inputs a feedback voltage to a feedback terminal FB of the switching control IC 200 in an insulated state.

An external circuit including a resistor Rss and a capacitor Css is connected between a soft start terminal SS and the ground GND.

A capacitor C4 is connected between the feedback terminal FB and the ground terminal.

The feedback circuit 12 operates in such a manner that the higher the output voltage output to the output terminals PO(+) and PO(G) with respect to a set voltage, the lower the voltage of the feedback terminal FB.

The switching control IC 200, which outputs a square wave signal from the OUT terminal, turns on/off the first switching device Q1 and the second switching device Q2 at a predetermined frequency via the driving circuit 11. As a result, the switching power supply apparatus 304 operates as a current resonant converter.

During a normal operation period in which an over-current protection circuit is not operating, the switching control IC 200 detects the output voltage on the basis of an input signal at the feedback terminal FB, and controls the frequency or pulse width of a square wave signal to be output to the OUT terminal such that the output voltage is maintained constant. As a result, the output voltage of the switching power supply apparatus 304 is stabilized.

The soft start terminal SS of the switching control IC 200 mainly functions as a terminal to enable a soft start operation. The soft start refers to control to gradually increase the on-period of an output pulse to drive the first and second switching devices Q1 and Q2, for example, at the time of activating the converter. The length of the soft start period is set by the time constant of the external circuit connected to the soft start terminal SS. More specifically, a constant current circuit is internally connected to the soft start terminal SS, and the values of this constant current and the capacitance of the capacitor Css determine a time constant to charge the capacitor Css.

Figure 3:
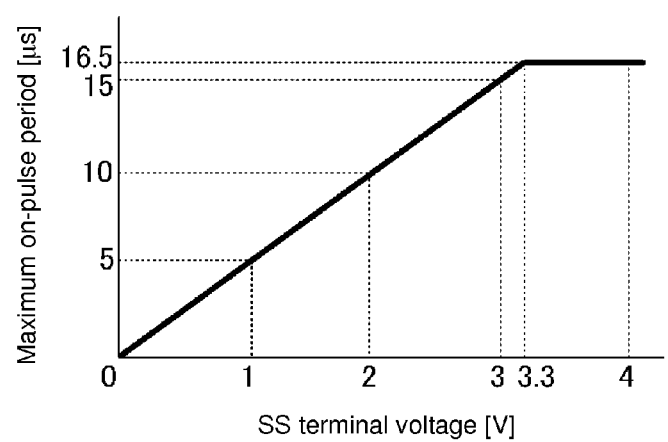
FIG. 3 is a diagram illustrating the relationship between the voltage of a soft start terminal SS and the maximum on-pulse period.

FIG. 3 is a diagram specifically illustrating the relationship between the voltage of the soft start terminal SS and the maximum on-pulse period. When the voltage of the soft start terminal SS is in the range of 0V to 3V, the maximum on-pulse period is determined so as to be proportional to the voltage of the soft start terminal SS, e.g., preferably within the range of about 0 to about 16.5 μs, for example. When the voltage of the soft start terminal SS is about 3.3 V or higher, the maximum on-pulse period is preferably maintained at about 16.5 μs, for example.

Figure 4:
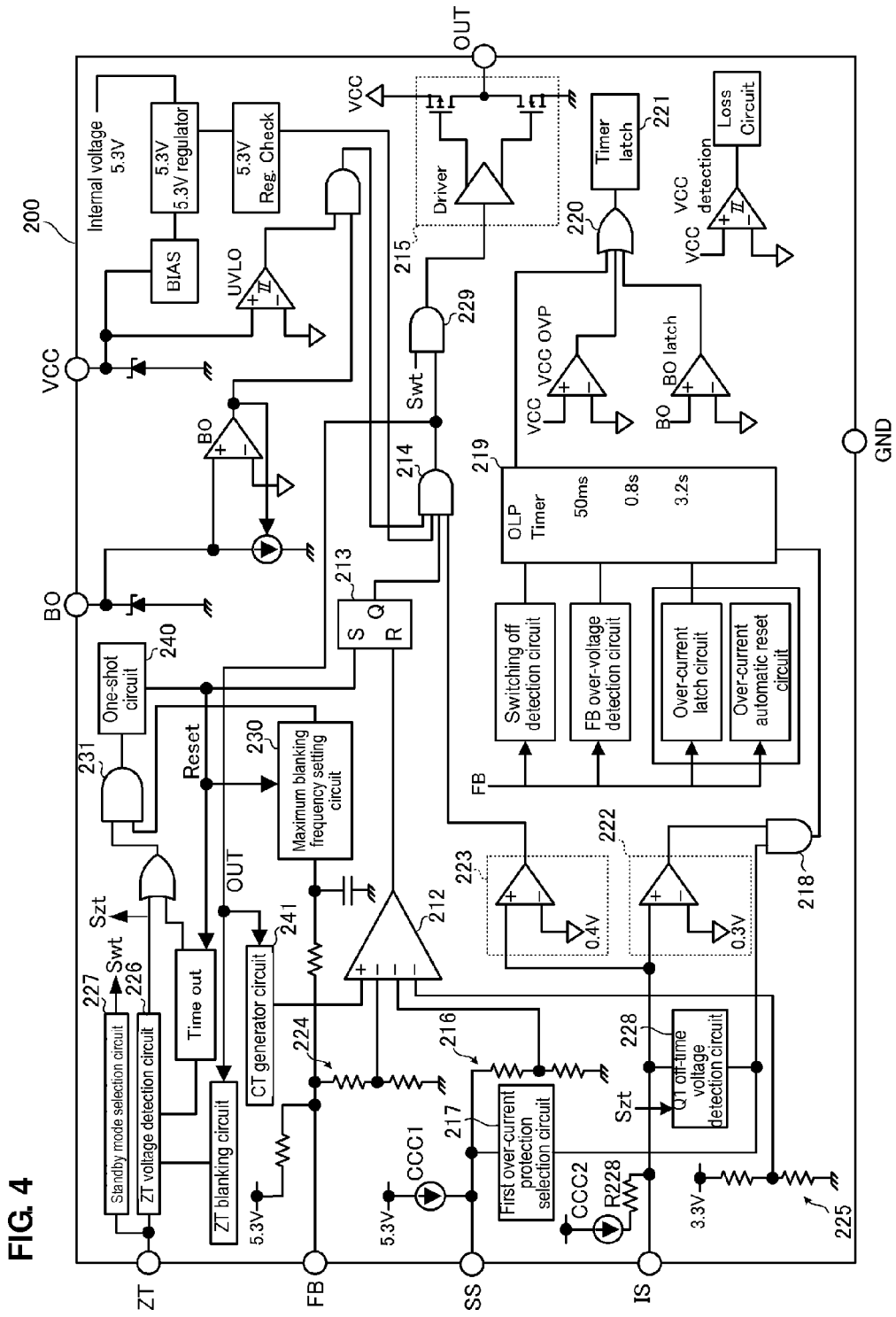
FIG. 4 is a block diagram of the internal configuration of a switching control IC 200.

FIG. 4 is a block diagram of the internal configuration of the switching control IC 200. Referring to FIG. 4, when a one-shot circuit 240 sets a flip-flop 213, a Q output signal of the flip-flop 213 is output to the OUT terminal through an AND gate 214 and a driver 215 as a high-level gate control signal.

A CT generator circuit 241 outputs a ramp waveform voltage after the output level of the AND gate 214 has become high. A comparator 212 resets the flip-flop 213 at the time when the output voltage of the CT generator circuit 241 exceeds the lowest voltage among the voltages input to the three (−) terminals. This makes the voltage of the OUT terminal return to a low level.

By repeating the above operations, the output voltage of the OUT terminal is made to change in the form of a square wave.

A constant current circuit CCC1 is connected to the soft start terminal SS. Referring to FIG. 2, by connecting the capacitor Css to the soft start terminal SS, the voltage of the soft start terminal SS is caused to be the same as the charge voltage of the capacitor Css. As the voltage of the soft start terminal SS increases, the timing at which the output of the comparator 212 is inverted is delayed such that the on-period of the switching devices is gradually increased. This enables a soft start operation. Note that by providing the constant current circuit CCC1 within the switching control IC, there is no need to externally connect a constant current circuit, resulting in a reduction in the number of components and a reduction in size.

Referring to FIG. 2, by externally connecting the resistor Rss to the soft start terminal SS, the voltage of the soft start terminal SS in a state in which the capacitor Css has been fully charged is determined in accordance with the current level of the constant current circuit CCC1 and the resistance of the resistor Rss.

By making a setting such that the output voltage of a resistor voltage divider circuit 216 is the lowest among the voltages input to the three (−) terminals of the comparator 212 during a soft start period, the length of the on-period of the switching devices gradually increases as the voltage of the soft start terminal SS increases such that a soft start operation is performed.

By making a setting such that the output voltage of a resistor voltage divider circuit 224 is the lowest among the voltages input to the three (−) terminals of the comparator 212 when the soft start operation is finished, the on-period of the switching devices is determined in accordance with the voltage applied to the feedback terminal FB.

The voltage of the soft start terminal SS is determined in accordance with the current level of the constant current circuit CCC1 and the resistance of the resistor Rss. Hence, when the voltage of the feedback terminal FB becomes this determined voltage of the soft start terminal SS or higher, the output voltage of the resistor voltage divider circuit 216 that is connected to the soft start terminal SS becomes the lowest among the voltages that are input to the three (−) terminals of the comparator 212 and, consequently, the on-period is no longer increased. In other words, the maximum on-pulse period is limited.

By making a setting such that, when the determined voltage of the soft start terminal SS after the completion of the soft start operation is about 3.3 V or higher, for example, the output voltage of a resistor voltage divider circuit 225 becomes the lowest among the voltages input to the three (−) terminals of the comparator 212 if the voltage of the feedback terminal FB becomes about 3.3 V or higher, for example, the on-period is no longer increased. In other words, the upper limit value of the maximum on-pulse period is set.

In this manner, since an IC terminal dedicated to the setting of the maximum on-pulse period need not be provided, the IC can be reduced in size. Further, by effectively utilizing the IC terminals, the functions of the IC can be enhanced. In addition, since the constant current circuit CCC1 is provided within the switching control IC, a constant current circuit need not be externally provided and, hence, the circuit configuration can be simplified.

Second Preferred Embodiment

Figure 5:
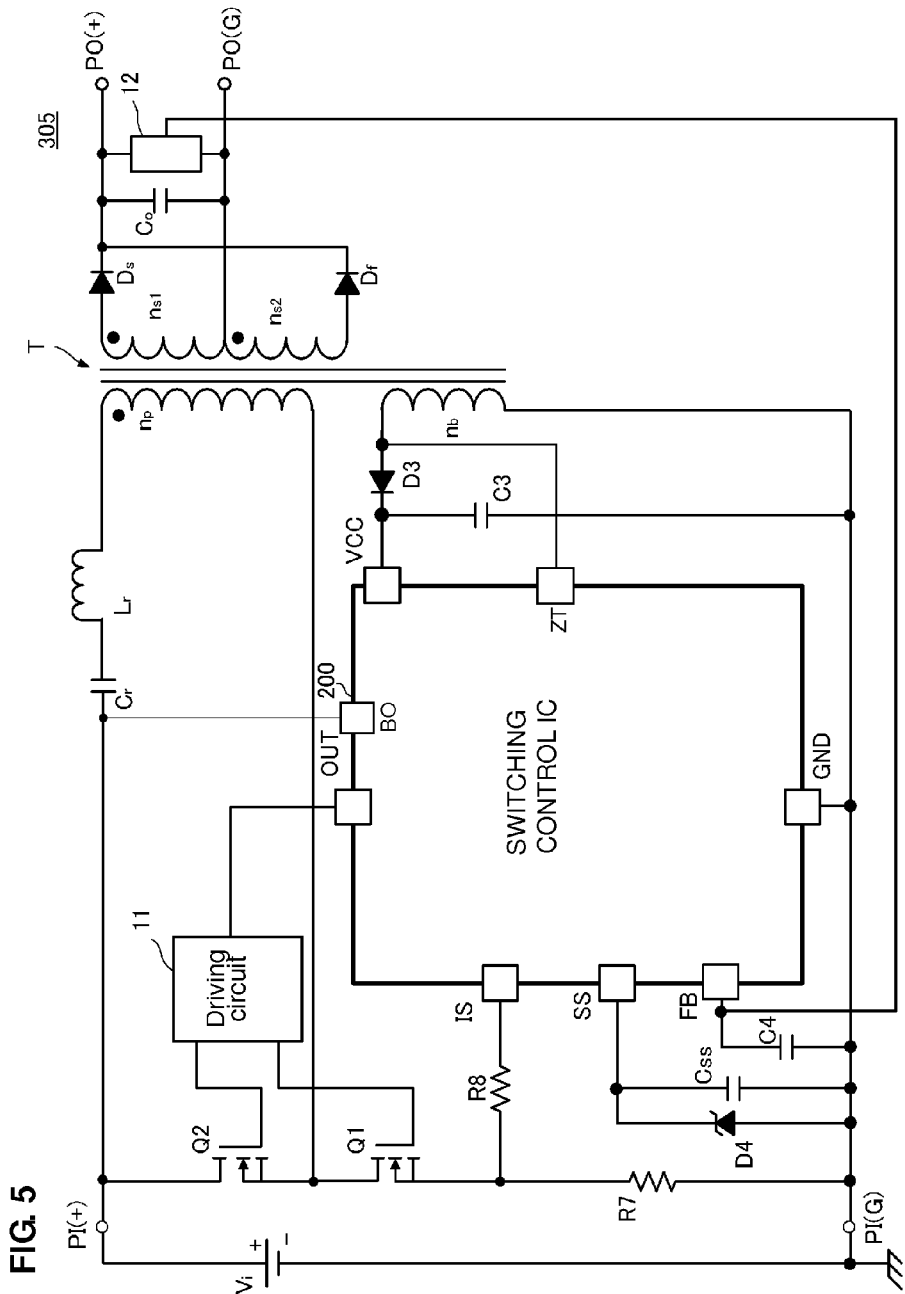
FIG. 5 is a circuit diagram of a switching power supply apparatus 305 according to a second preferred embodiment of the present invention.

FIG. 5 is a circuit diagram of a switching power supply apparatus 305 according to a second preferred embodiment of the present invention. The switching power supply apparatus 305 includes the switching control IC 200 corresponding to the switching control circuit of a preferred embodiment of the present invention.

Unlike the switching power supply apparatus illustrated in FIG. 2, an external circuit including a Zener diode D4 and the capacitor Css is connected between the soft start terminal SS and the ground. When the Zener voltage of the Zener diode D4 is below about 3.3 V, for example, the upper limit voltage of the soft start terminal SS is limited to the Zener voltage of the Zener diode D4. As a result, since the output voltage of the resistor voltage divider circuit 216 to which the soft start terminal SS is connected becomes the lowest among the voltages that are input to the three (−) terminals of the comparator 212 illustrated in FIG. 4, the on-period is no longer increased. In other words, the maximum on-pulse period is limited by the Zener diode D4.

Figure 14:
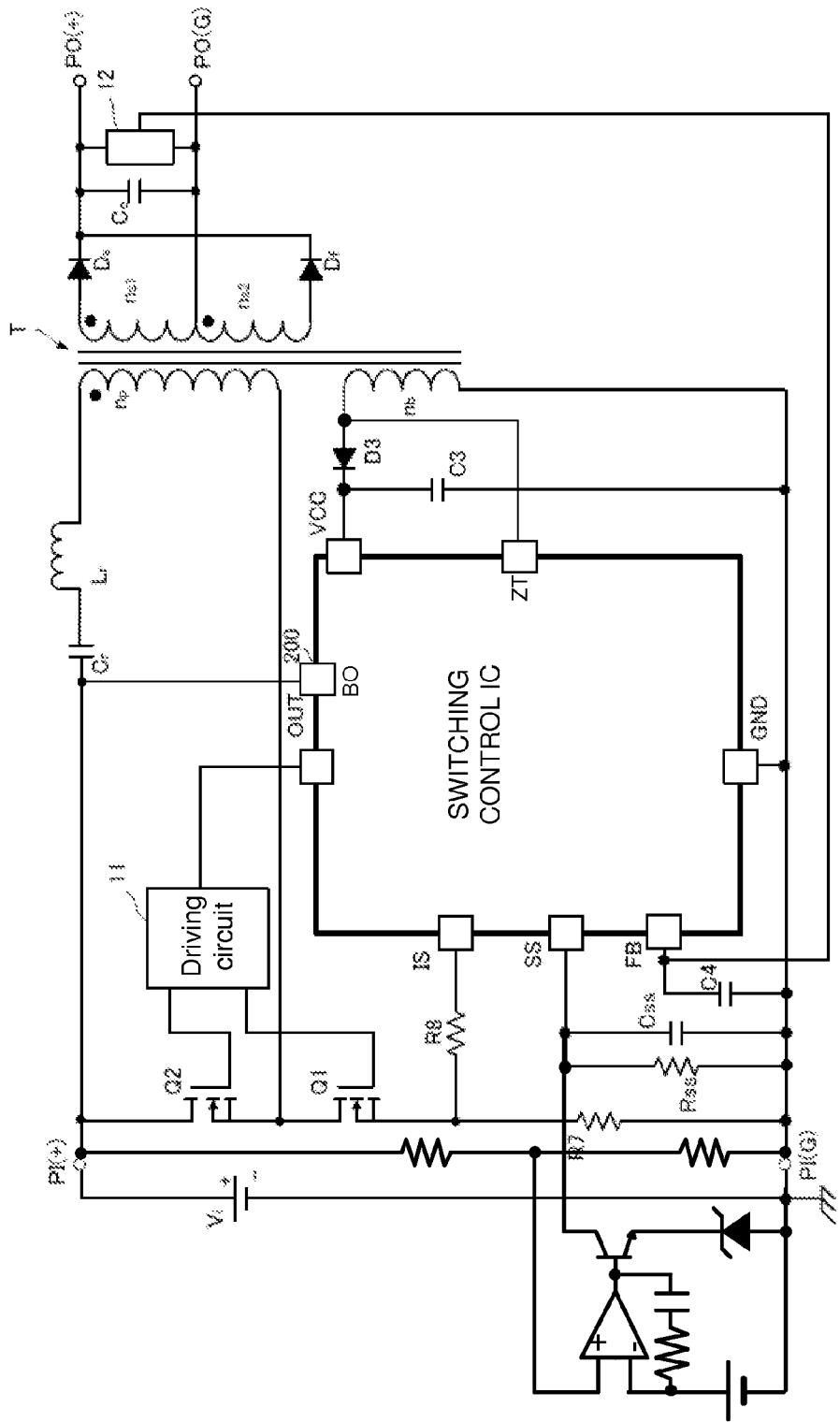
FIG. 14 is a circuit diagram of a switching power supply apparatus according to another preferred embodiment of the present invention.

Although a voltage clamp circuit based on a Zener diode is preferably arranged as an external circuit connected to the soft start terminal SS in the example shown above, a transistor or an operational amplifier, other than a Zener diode, may be used as this external circuit, for example as shown in FIG. 14.

Third Preferred Embodiment

Figure 6:
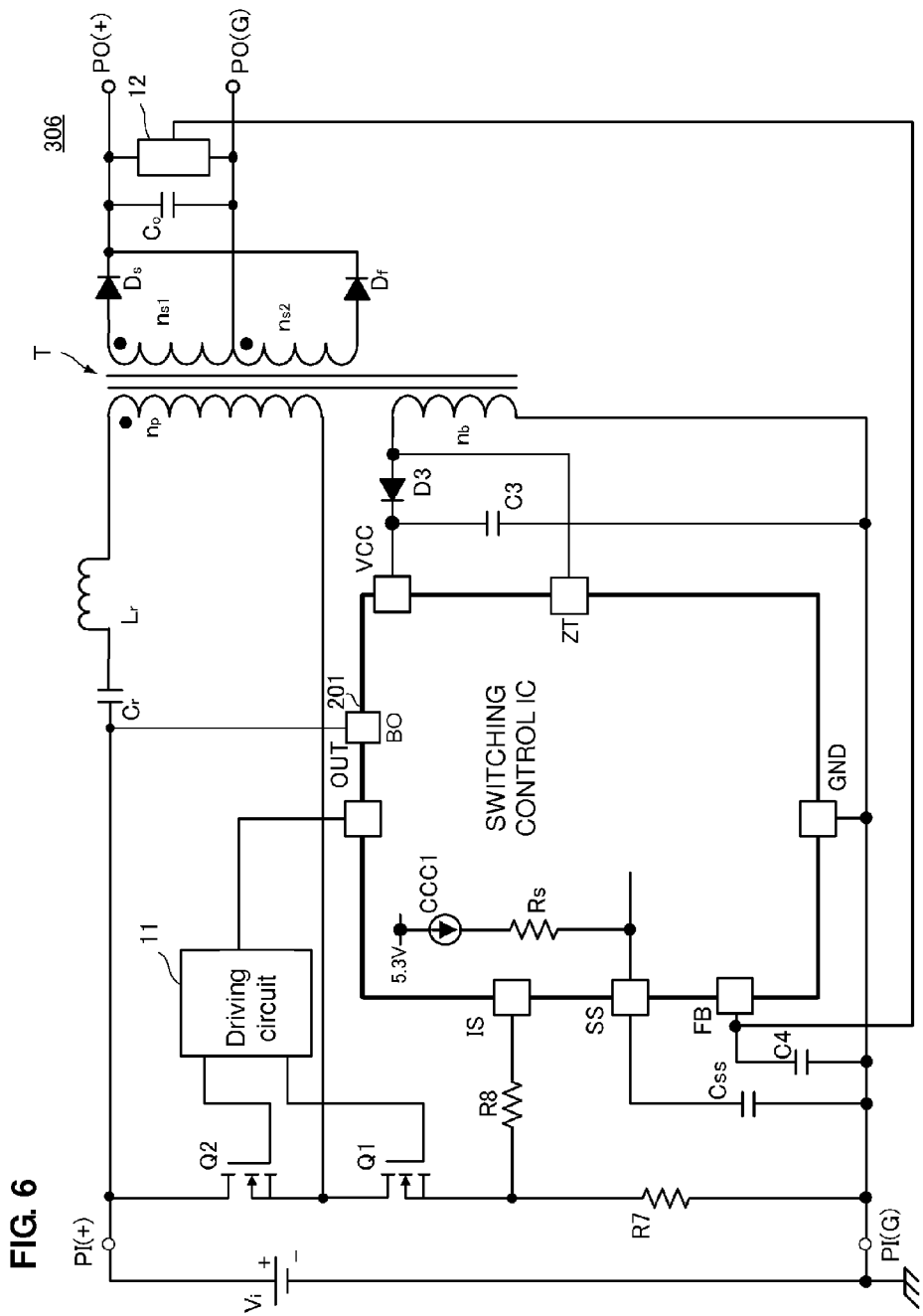
FIG. 6 is a circuit diagram of a switching power supply apparatus 306 according to a third preferred embodiment of the present invention.

FIG. 6 is a circuit diagram of a switching power supply apparatus 306 according to a third preferred embodiment of the present invention. The switching power supply apparatus 306 includes a switching control IC 201 corresponding to the switching control circuit of a preferred embodiment of the present invention. Unlike the switching control IC 200 illustrated in FIG. 4, a resistor Rs is connected between the constant current circuit CCC1 and the soft start terminal SS. The rest of the configuration is preferably similar to that illustrated in FIG. 4.

Figure 7:
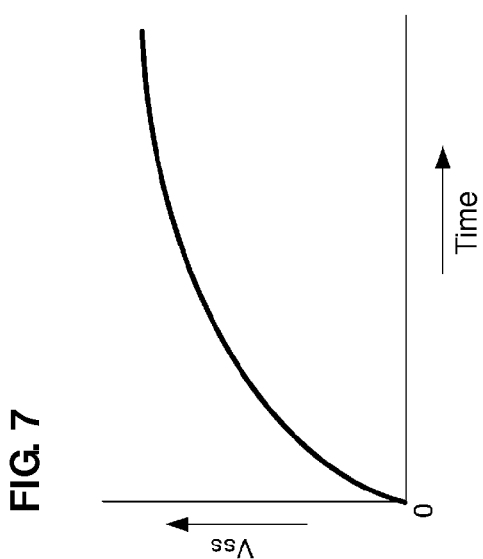
FIG. 7 is a waveform diagram illustrating the voltage of the soft start terminal SS versus time at activation time of the switching power supply apparatus 306 in the third preferred embodiment of the present invention.

FIG. 7 is a waveform diagram illustrating the voltage of the soft start terminal SS versus time at activation time. The voltage of the soft start terminal SS transiently changes in accordance with a time constant defined by the resistor Rs and the capacitor Css. Hence, the rate at which an on-pulse period is increased can be decreased with time after activation.

Fourth Preferred Embodiment

Figure 8:
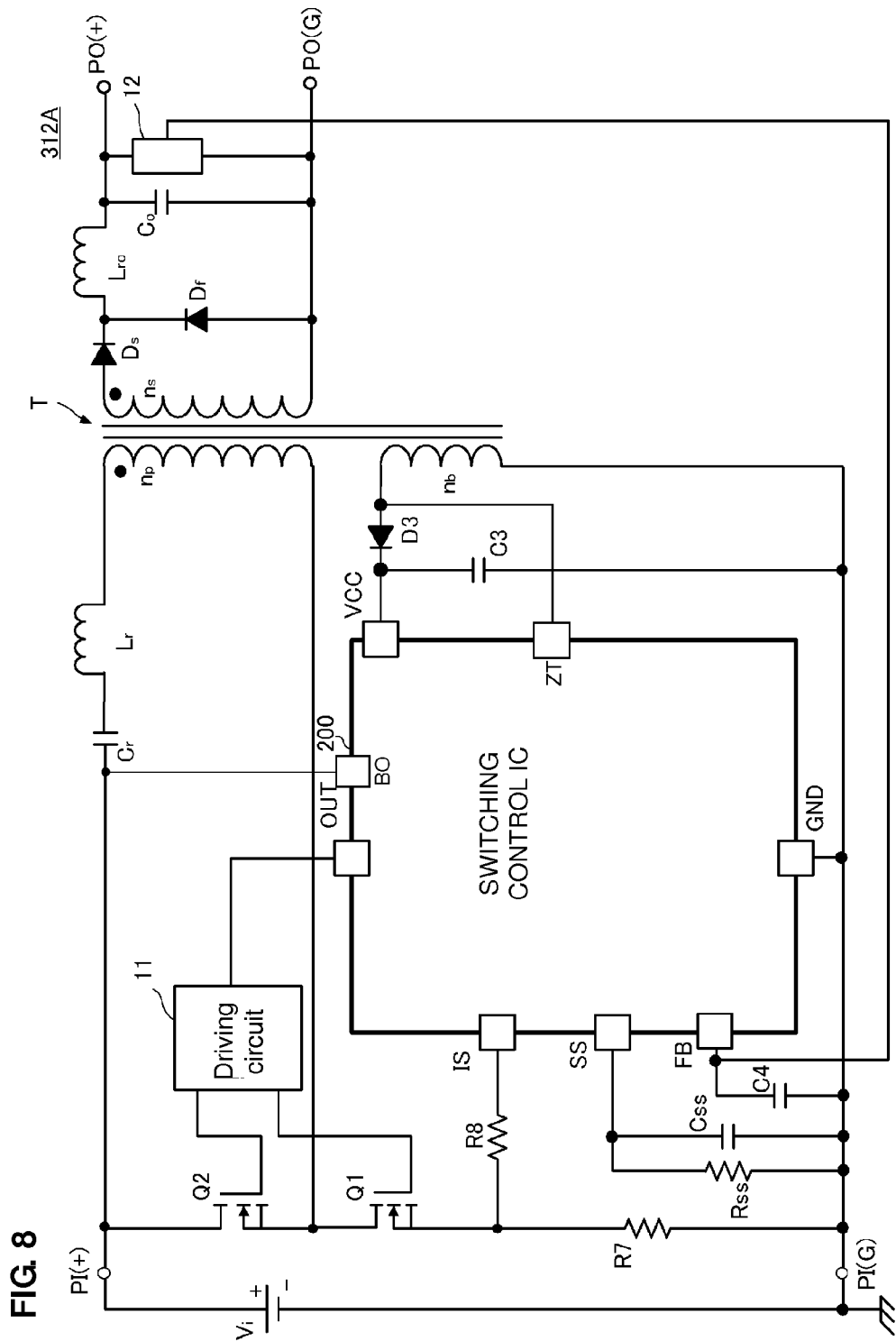
FIG. 8 is a circuit diagram of a switching power supply apparatuses 312A according to a fourth preferred embodiment of the present invention.
Figure 9:
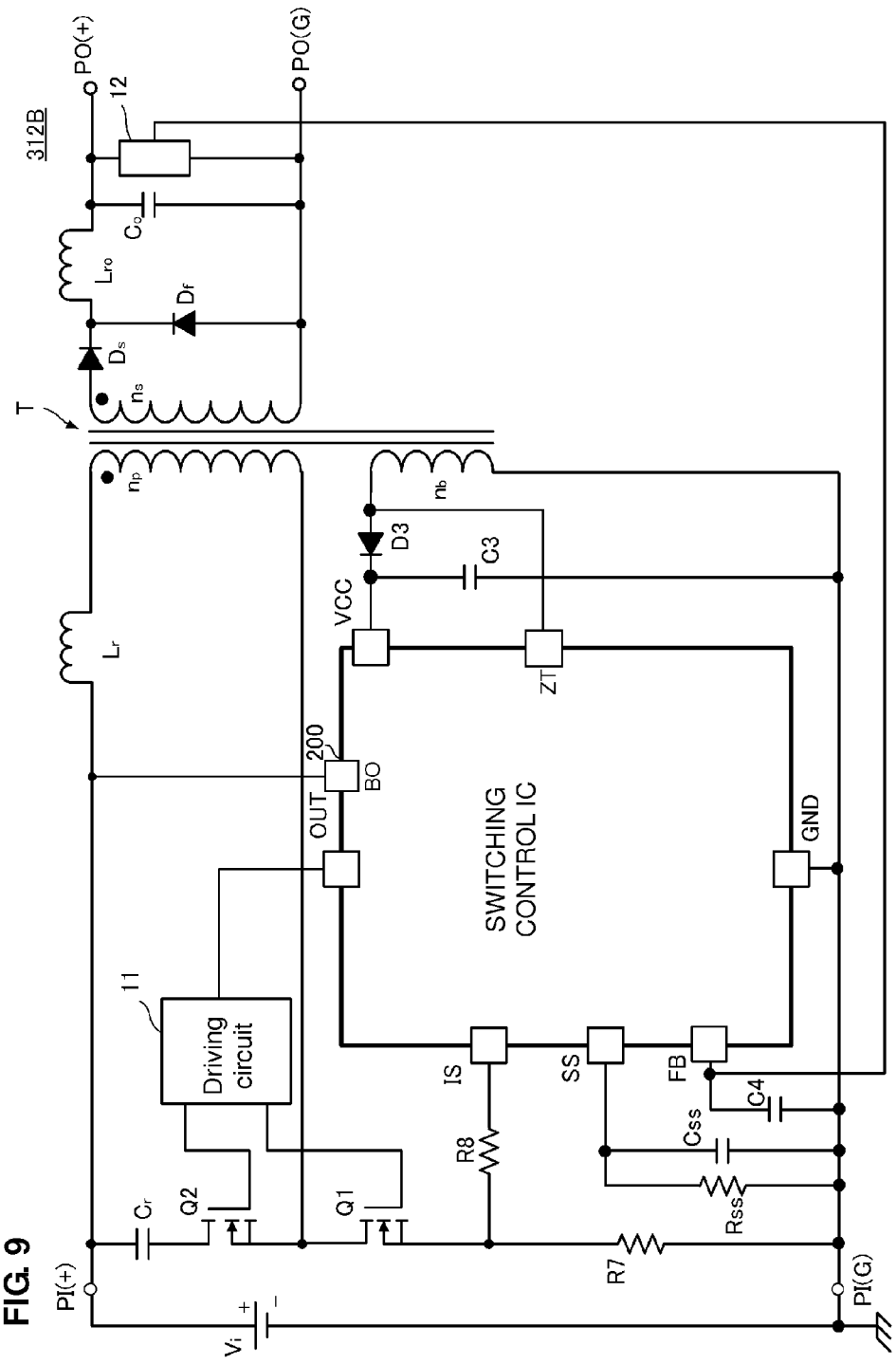
FIG. 9 is a circuit diagram of a switching power supply apparatuses 312B according to the fourth preferred embodiment of the present invention.

FIG. 8 and FIG. 9 are circuit diagrams of switching power supply apparatuses 312A and 312B according to a fourth preferred embodiment of the present invention. The switching power supply apparatus 312A and the switching power supply apparatus 312B include the switching control IC 200 according to a preferred embodiment of the present invention. The secondary side of the transformer T preferably is of the forward type in both the switching power supply apparatus 312A and the switching power supply apparatus 312B. FIG. 8 is different from FIG. 9 in terms of a position at which the primary side capacitor Cr is connected.

In this manner, a forward system may preferably be used by providing a rectifying/smoothing circuit including the diodes Ds and Df, an inductor Lro, and the capacitor Co on the secondary side of the transformer T.

The capacitor Cr may be connected to the drain of the second switching device Q2 in series as illustrated in FIG. 9, since it is only required that the primary side resonant capacitor Cr be inserted into a closed loop that is formed during the on-period of the high-side second switching device Q2.

The rest of the configuration, and the operations and advantages, preferably are similar to those shown in the first preferred embodiment of the present invention.

Fifth Preferred Embodiment

Figure 10:
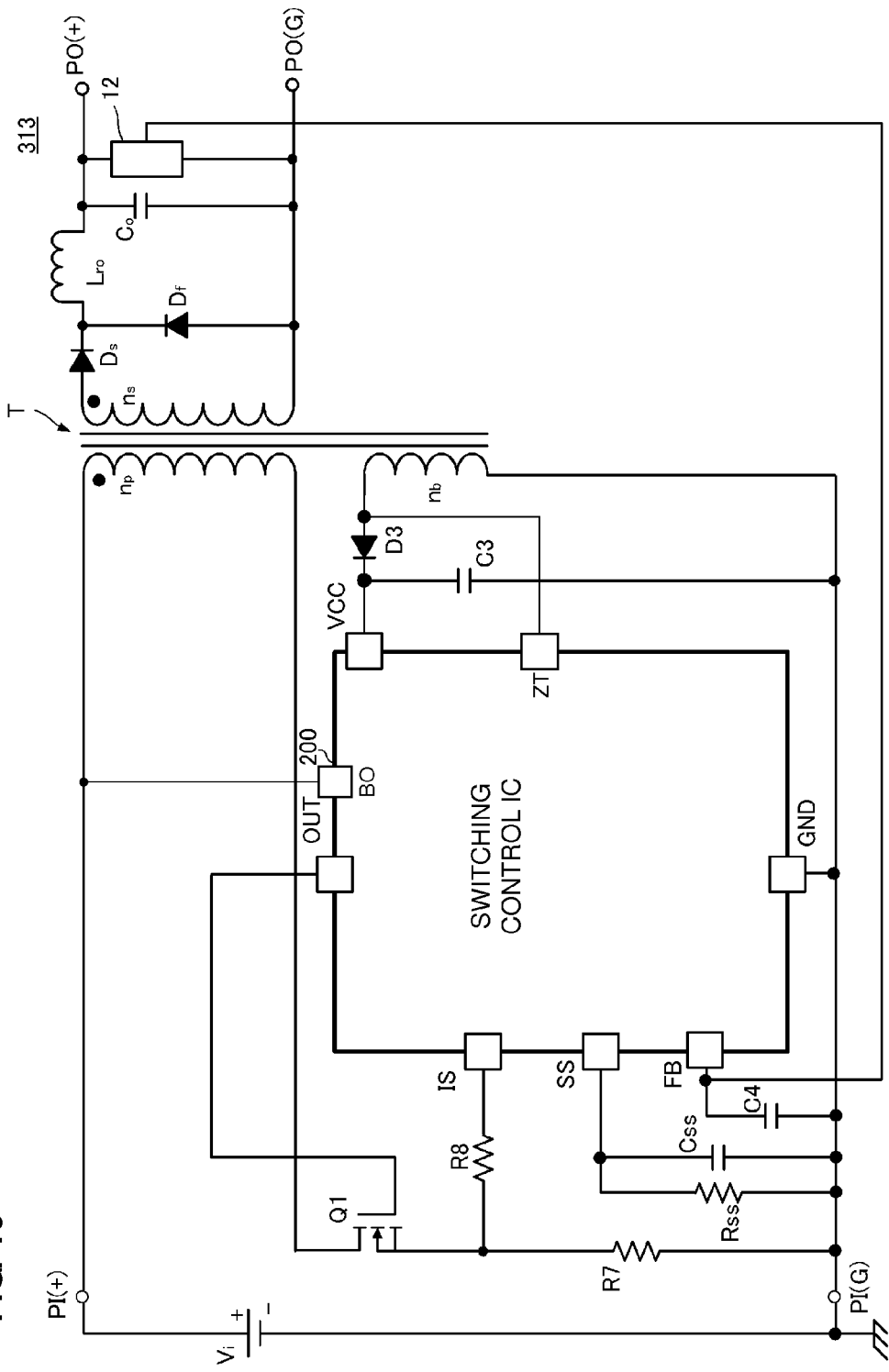
FIG. 10 is a circuit diagram of a switching power supply apparatus 313 according to a fifth preferred embodiment of the present invention.

FIG. 10 is a circuit diagram of a switching power supply apparatus 313 according to a fifth preferred embodiment of the present invention. The switching power supply apparatus 313 includes the switching control IC 200 corresponding to the switching control circuit of a preferred embodiment of the present invention. The secondary side of the transformer T of the switching power supply apparatus 313 is of the forward type.

Unlike the switching power supply apparatus 304 illustrated in FIG. 2, a simple forward converter is provided without providing the inductor Lr, the capacitor Cr, and the second switching device Q2.

In this manner, a simple forward converter can be similarly used, and similar operations and advantages are provided.

Sixth Preferred Embodiment

Figure 11:
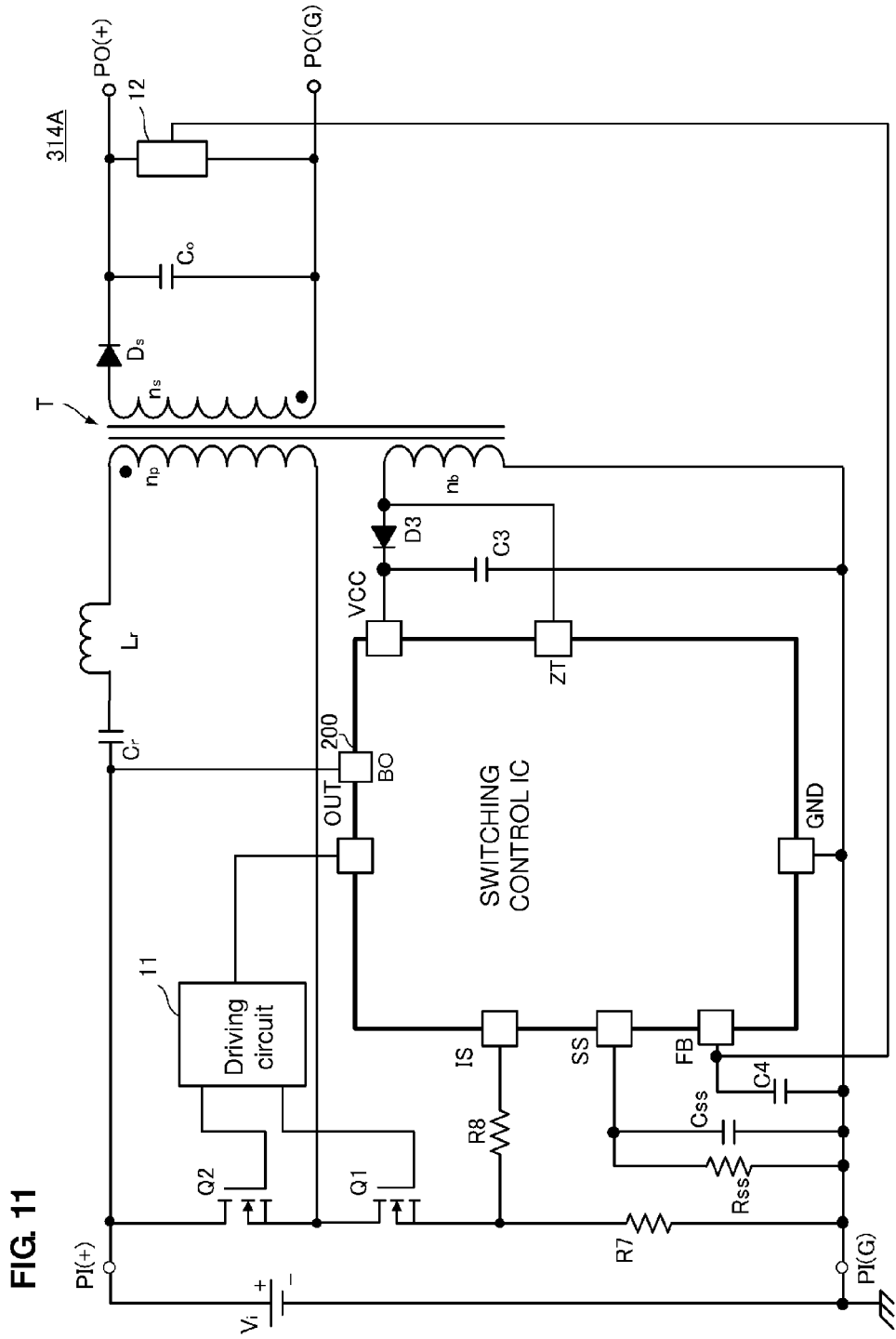
FIG. 11 is a circuit diagram of a switching power supply apparatuses 314A according to a sixth preferred embodiment of the present invention.
Figure 12:
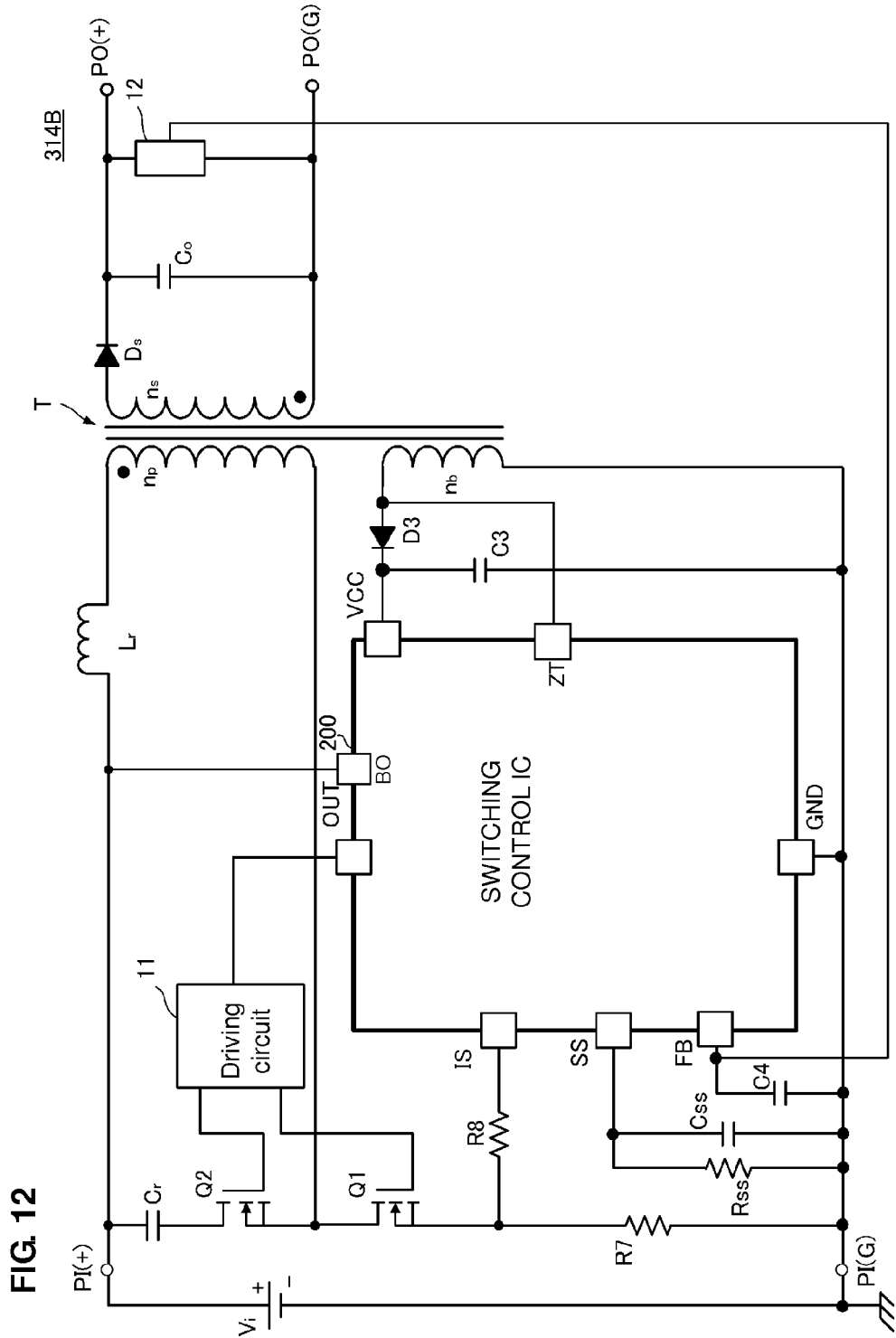
FIG. 12 is a circuit diagram of a switching power supply apparatuses 314B according to the sixth preferred embodiment of the present invention.

FIG. 11 and FIG. 12 are circuit diagrams of switching power supply apparatuses 314A and 314B according to a sixth preferred embodiment of the present invention. The switching power supply apparatus 314A and the switching power supply apparatus 314B include the switching control IC 200 according to a preferred embodiment of the present invention. The secondary side of the transformer T preferably is of the fly-back type in both the switching power supply apparatus 312A and the switching power supply apparatus 312B. FIG. 11 is different from FIG. 12 in terms of a position at which the primary side capacitor Cr is connected.

In this manner, a fly-back system may include the diode Ds, the capacitor Co, and a rectifying/smoothing circuit on the secondary side of the transformer T.

The capacitor Cr may be connected to the drain of the second switching device Q2 in series as illustrated in FIG. 12, since it is only required that the primary side resonant capacitor Cr be inserted into a closed loop that is formed during the on-period of the high-side second switching device Q2.

The rest of the configuration, and the operations and advantages, preferably are similar to those shown in the first preferred embodiment.

Seventh Preferred Embodiment

Figure 13:
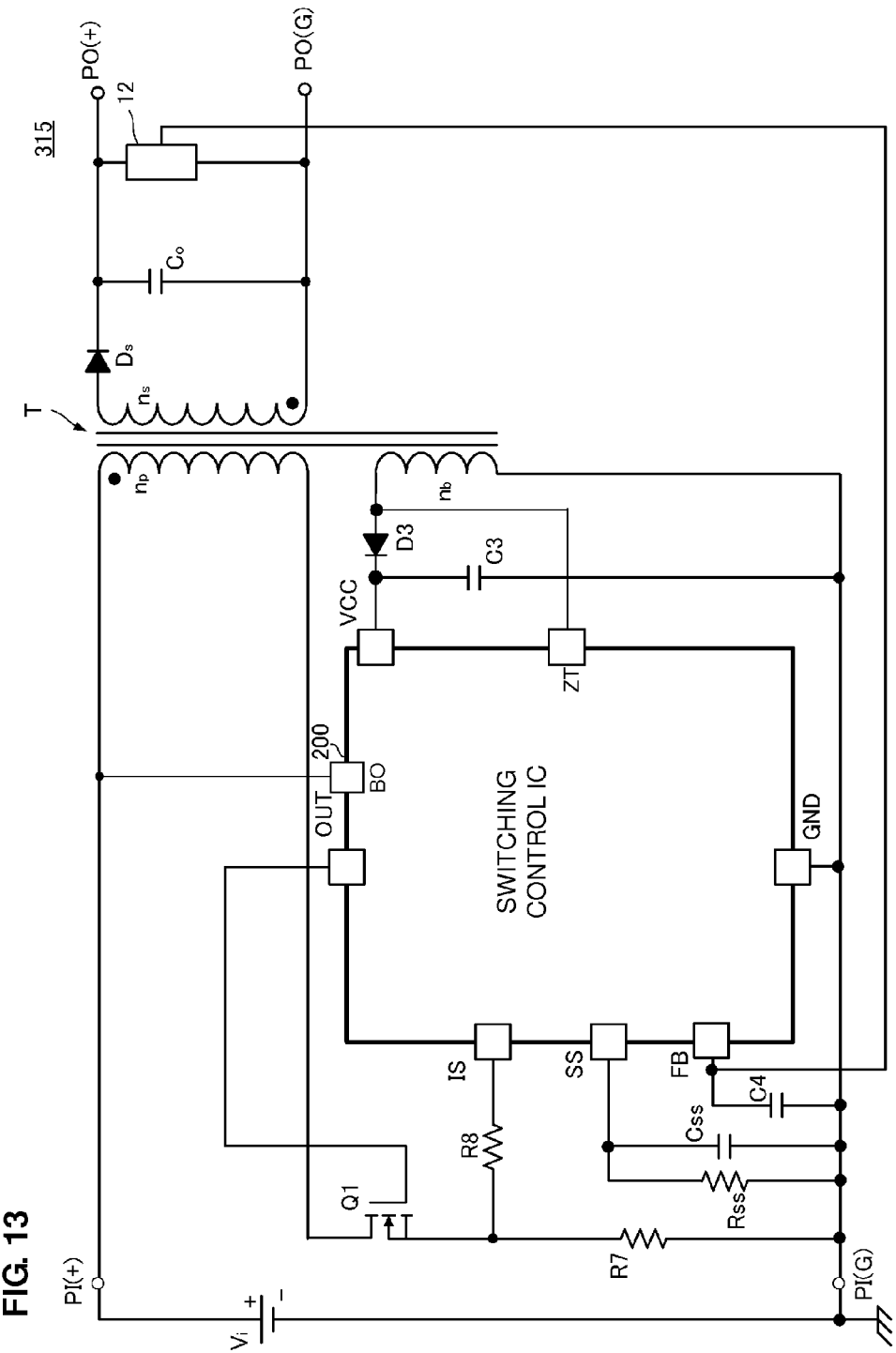
FIG. 13 is a circuit diagram of a switching power supply apparatuses 315 according to a seventh preferred embodiment of the present invention.

FIG. 13 is a circuit diagram of a switching power supply apparatus 315 according to a seventh preferred embodiment of the present invention. The switching power supply apparatus 315 includes the switching control IC 200 corresponding to the switching control circuit of a preferred embodiment of the present invention. The secondary side of the transformer T of the switching power supply apparatus 315 preferably is of the fly-back type.

Unlike the switching power supply apparatus 314A illustrated in FIG. 11, a simple fly-back converter is provided without providing the inductor Lr, the capacitor Cr, and the second switching device Q2.

In this manner, a simple fly-back converter can be similarly used, and similar operations and advantages are preferably provided.

Other Preferred Embodiments

Figure 15:
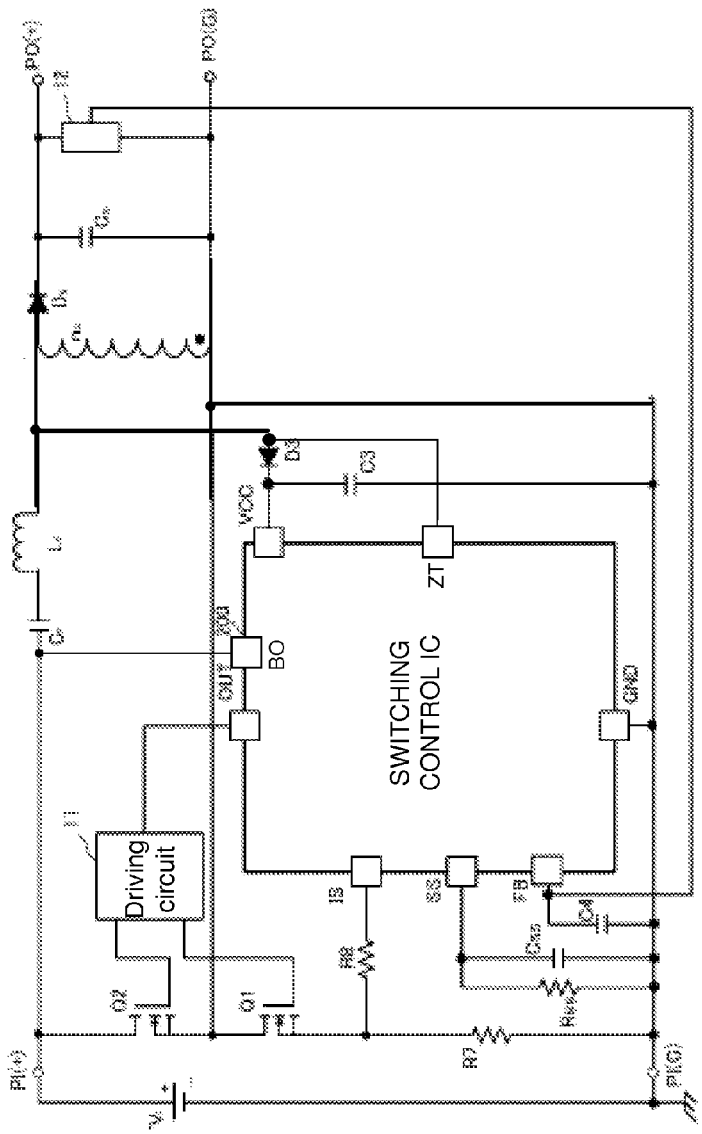
FIG. 15 is a circuit diagram of a switching power supply apparatus according to another preferred embodiment of the present invention.
Figure 16:
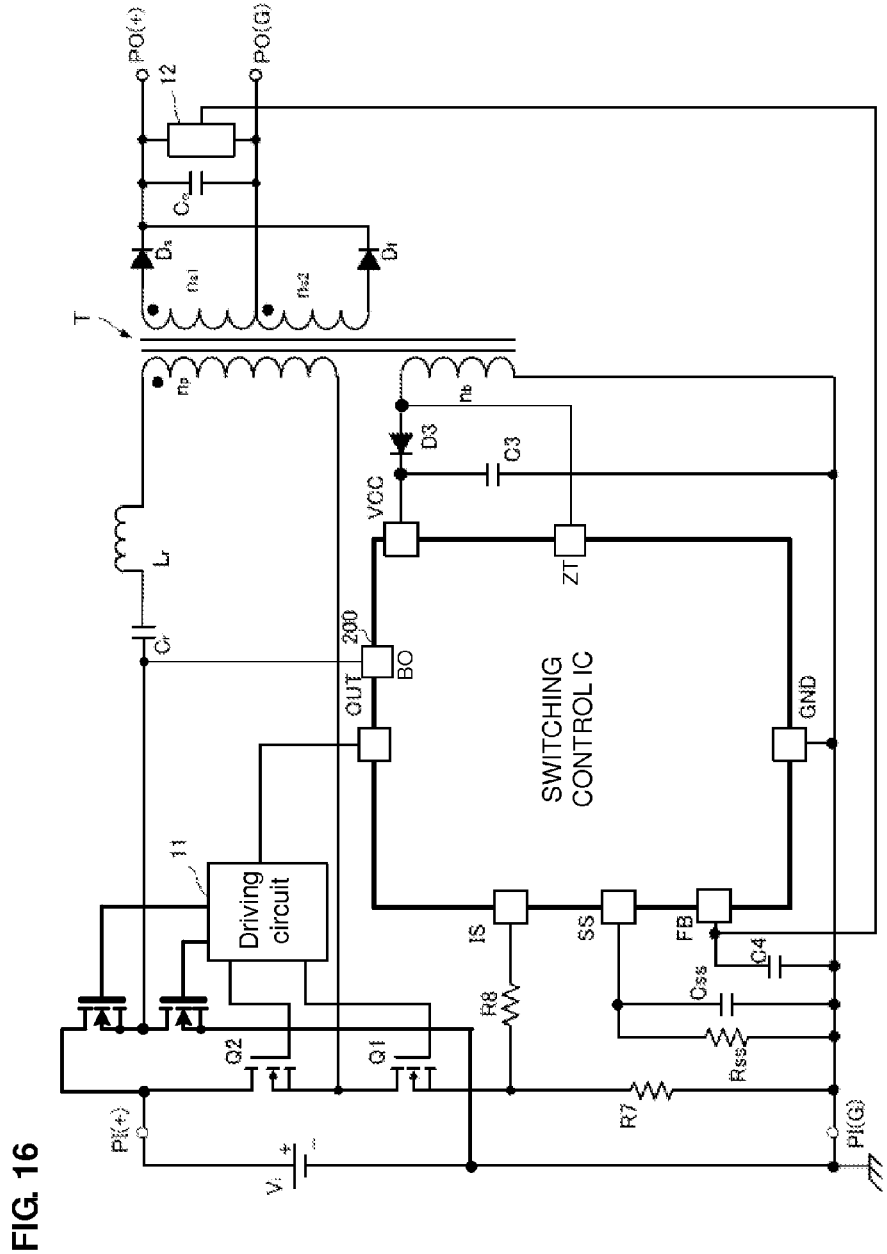
FIG. 16 is a circuit diagram of a switching power supply apparatus according to another preferred embodiment of the present invention.

The type of converter of the switching power supply apparatus of the present invention may be a non-insulating converter as shown in FIG. 15, and is not limited to an insulating converter. Further, various preferred embodiments of the present invention may be applied to a full-bridge type configuration as shown in FIG. 16, and is not limited to a half-bridge type configuration.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching control circuit for use in a power conversion circuit of a switching power supply apparatus, the switching control circuit comprising:
 a plurality of external terminals;
 a semiconductor integrated circuit arranged to control on/off operations of a switching device;
 a soft start terminal that receives a control voltage used to control of on/off switching operations of the switching device during a soft start period, which is an activation period from a start of an operation to a steady operation of the power conversion circuit;
 a soft start controller arranged and programmed to control an on-period of the switching device during the activation period based on a signal of the soft start terminal; and
 a maximum on-pulse period limiting device arranged to detect, as a determination object signal, a voltage induced in an external circuit that is connected to the soft start terminal and that includes at least a resistor element or a semiconductor element, and arranged to set a limit value of an on-period of the switching device during a normal period in accordance with the determination object signal.

2. The switching control circuit according to claim 1, wherein the soft start period is set by a capacitance value of the external circuit connected to the soft start terminal.

3. The switching control circuit according to claim 1, wherein the soft start controller includes a voltage-period conversion circuit that converts the voltage of the soft start terminal into an on-pulse period of a control signal for the switching device.

4. The switching control circuit according to claim 3, wherein there is a linear relationship between the voltage and the period in the voltage-period conversion circuit.

5. The switching control circuit according to claim 1, wherein the voltage-period conversion circuit sets a limit value of the on-pulse period, and sets an upper limit of the limit value of the on-pulse period when the voltage of the soft start terminal is a predetermined voltage or higher.

6. The switching control circuit according to claim 1, wherein the maximum on-pulse period limiting device sets the limit value of the on-pulse period using a Zener voltage induced in a Zener diode connected to the soft start terminal.

7. The switching control circuit according to claim 1, wherein the external circuit includes a Zener diode and a capacitor connected between the soft start terminal and ground.

8. A switching power supply apparatus comprising:
 a power conversion circuit; and
 the switching control circuit according to claim 1 provided in the power conversion circuit.

9. The switching power supply apparatus according to claim 8, further comprising an insulating converter.

10. The switching power supply apparatus according to claim 8, further comprising a non-insulating converter.

11. The switching power supply apparatus according to claim 8, further comprising a fly-back converter.

12. The switching power supply apparatus according to claim 8, further comprising a transformer, wherein a secondary side of the transformer is a forward type.

13. The switching power supply apparatus according to claim 12, further comprising a rectifying/smoothing circuit including diodes, an inductor, and a capacitor on the secondary side of the transformer.

14. The switching power supply apparatus according to claim 8, further comprising a forward converter.

15. The switching power supply apparatus according to claim 8, further comprising a fly-back system including a rectifying/smoothing circuit on the secondary side of the transformer.

16. The switching control circuit according to claim 1, further comprising a constant current circuit that supplies a constant current to the soft start terminal.

17. The switching control circuit according to claim 16, wherein a resistor is connected between the constant current circuit and the soft start terminal.

18. The switching control circuit according to claim 1, wherein the external circuit includes a transistor or an operational amplifier and a capacitor connected between the soft start terminal and ground.

19. The switching control circuit according to claim 1, wherein the switching device has a full-bridge configuration.

20. The switching control circuit according to claim 1, wherein the switching device has a half-bridge configuration.

* * * * *